US012694552B2

(12) United States Patent
Matsuda

(10) Patent No.: US 12,694,552 B2
(45) Date of Patent: Jul. 28, 2026

(54) IMAGE PROCESSING APPARATUS, IMAGE PICKUP APPARATUS, IMAGE PROCESSING METHOD, AND STORAGE MEDIUM

(71) Applicant: CANON KABUSHIKI KAISHA, Tokyo (JP)

(72) Inventor: Nobuto Matsuda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 294 days.

(21) Appl. No.: 18/409,988

(22) Filed: Jan. 11, 2024

(65) Prior Publication Data

US 2024/0242368 A1     Jul. 18, 2024

(30) Foreign Application Priority Data

Jan. 13, 2023     (JP) ................................. 2023-003863

(51) Int. Cl.
*G06T 7/62*          (2017.01)
*G06T 3/40*          (2024.01)
*G06V 40/16*         (2022.01)

(52) U.S. Cl.
CPC .................. *G06T 7/62* (2017.01); *G06T 3/40* (2013.01); *G06V 40/161* (2022.01); *G06T 2207/30201* (2013.01)

(58) Field of Classification Search
CPC ..... G06T 7/62; G06T 3/40; G06T 2207/3021; G06V 40/161
See application file for complete search history.

(56) References Cited

U.S. PATENT DOCUMENTS

| | | | | |
|---|---|---|---|---|
| 8,253,847 B2* | 8/2012 | Abe | ...................... | H04N 23/61 |
| | | | | 348/222.1 |
| 9,900,523 B2* | 2/2018 | Sato | ...................... | H04N 23/80 |
| 10,740,593 B1* | 8/2020 | Kim | ..................... | G06V 10/771 |
| 10,861,140 B2* | 12/2020 | Imai | .................... | G06V 40/165 |
| 12,284,444 B2* | 4/2025 | Zu | ........................ | H04N 23/611 |
| 12,505,652 B2* | 12/2025 | Zhang | ................. | G06V 10/774 |

FOREIGN PATENT DOCUMENTS

| | | |
|---|---|---|
| JP | 11-353477 A | 12/1999 |
| JP | 2011-249923 A | 12/2011 |
| JP | 2017-041791 A | 2/2017 |

* cited by examiner

*Primary Examiner* — Gregory M Desire
(74) *Attorney, Agent, or Firm* — Cowan, Liebowitz & Latman, P.C.

(57)          ABSTRACT

An image processing apparatus acquires a size of an object area in first image data, acquires characteristic data on a characteristic of an optical system according to the size of the object area, and generates second image data by applying the characteristic data to the first image data.

17 Claims, 5 Drawing Sheets

IMAGE PROCESSING APPARATUS, IMAGE PICKUP APPARATUS, IMAGE PROCESSING METHOD, AND STORAGE MEDIUM

BACKGROUND

Technical Field

One of the aspects of the embodiments relates to an image processing apparatus, an image pickup apparatus, an image processing method, and a storage medium.

Description of Related Art

Japanese Patent Laid-Open No. 2017-41791 discloses a method of determining whether to perform image processing assuming skin beautification processing based on whether or not there is a person's face in the image. This method takes advantage of the characteristic that a person's face is present in the image in imaging a portrait, and performs image processing only for the image for which the skin beautification effect is desired, thereby suppressing the influence of image processing.

Japanese Patent Laid-Open No. 11-353477 discloses an image processing method for reproducing flare by converting an original image signal into a converted image signal representing amounts corresponding to object luminance, incident light intensity, or reproduced luminance, by performing smoothing processing for the converted image signal, and then by inversely converting it into an image signal.

Japanese Patent Laid-Open No. 2011-249923 discloses bokeh filter processing for generating a blurred image using a bokeh filter that reflects the bokeh degree of a virtual imaging lens in which a depth of field is set to a specified depth of field and an in-focus distance is set to a specified in-focus distance.

In the method disclosed in Japanese Patent Laid-Open No. 2017-41791, if the face in the image is small, the disadvantages of the skin beautification treatment are more intensified than the effects, and the bokeh is enhanced. In the image processing method disclosed in Japanese Patent Laid-Open No. 11-353477, the provided effect may be too strong or too weak depending on the size of the object. In the bokeh filter processing disclosed in Japanese Patent Laid-open No. 2011-249923, the batch processing that does not change a parameter that changes the effect depending on the object applies the same processing to large and small objects, and the effect may be too strong or too weak.

SUMMARY

An image processing apparatus according to one aspect of the embodiment includes a memory storing instructions, and a processor configured to execute the instructions to acquire a size of an object area in first image data, acquire characteristic data on a characteristic of an optical system according to the size of the object area, and generate second image data by applying the characteristic data to the first image data. An image pickup apparatus having the above image processing apparatus also constitutes another aspect of the embodiment. An image processing method corresponding to the image pickup apparatus also constitutes another aspect of the embodiment. A storage medium storing a program that causes a computer to execute the above image processing method also constitutes another aspect of the embodiment.

Further features of the disclosure will become apparent from the following description of embodiments with reference to the attached drawings.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

First Embodiment

Figure 1:
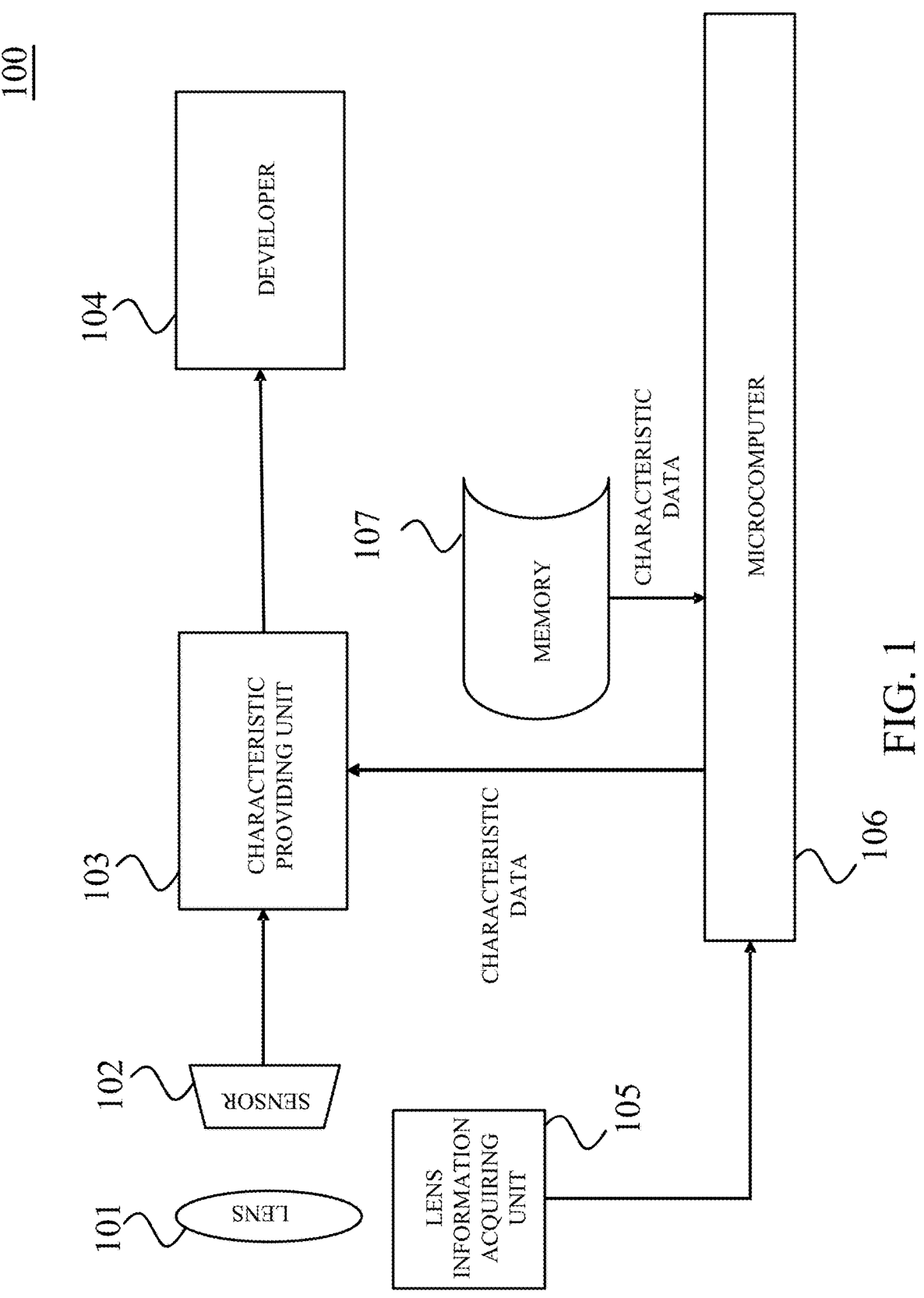
FIG. 1 is a block diagram of an image pickup apparatus according to a first embodiment.

Referring now to FIG. 1, a description will be given of an image pickup apparatus (image processing apparatus) 100 according to a first embodiment. FIG. 1 is a block diagram of the image pickup apparatus 100. A lens 101 is an optical system (imaging optical system) configured to form an optical image of an object. A sensor 102 is an image sensor such as a CMOS sensor, and photoelectrically converts an optical image formed by the lens 101 to output raw (RAW) image data. In this embodiment, the lens apparatus including the lens 101 is attachable to and detachable from the camera body including the sensor 102, but this embodiment is not limited to this example, and the camera body and the lens apparatus may be integrated with each other.

A characteristic providing (or adding) unit (generator) 103 generates raw image data to which a desired lens characteristic is provided by providing a lens characteristic, which will be described below, to the raw image data through image processing. Thus, the characteristic providing unit 103 generates raw image data to which the lens characteristic is provided, by performing image processing for the raw image data using characteristic data corresponding to a characteristic (such as an aberration characteristic) of the lens 101. The developer (developing unit) 104 develops the raw image data to which the lens characteristic is provided and outputs video data. The video data is used for video recording and video output.

A lens information acquiring unit 105 acquires lens information (information about the optical system) such as a focal length and focus position information in a case where the lens 101 forms an optical image. A microcomputer 106 is a control unit configured to control each component in the image pickup apparatus 100, and acquires lens information from the lens information acquiring unit 105. The lens information acquiring unit 105 and the microcomputer 106 function as an object acquiring unit configured to acquire a size of an object area (object size) in the raw image data based on lens information. The size of the object area is the size of the processing area of the characteristic providing unit 103 (size in pixels of processing by the characteristic providing unit 103), or a ratio to the overall size of the raw image data. The object acquiring unit acquires an object area from at least one of the focus position, zoom magnification, focal length of the lens 101, pixel pitch of the sensor 102, or the effective number of pixels of the sensor 102. In a case where the sensor 102 has a parameter that changes the number of output pixels, such as addition readout or thinning readout, the object acquiring unit can calculate the size of the object area based on the number of output pixels of the sensor 102. In a case where the raw image data is enlarged or reduced between the sensor 102 and the characteristic providing unit 103, the object acquiring unit can calculate the size of the object area based on the enlargement rate or reduction rate of the raw image data.

A memory 107 is a memory (storage) configured to store characteristic data of the lens 101. The microcomputer 106 selects and acquires a desired lens characteristic (characteristic data of the lens 101) from a plurality of characteristic data stored in the memory 107, and sets the acquired lens characteristic in the characteristic providing unit 103. That is, the microcomputer 106 functions as a characteristic data acquiring unit configured to acquire characteristic data on the characteristic of the lens 101 according to the size of the object area. Thereby, image data to which a desired lens characteristic is provided can be acquired.

Figure 2:
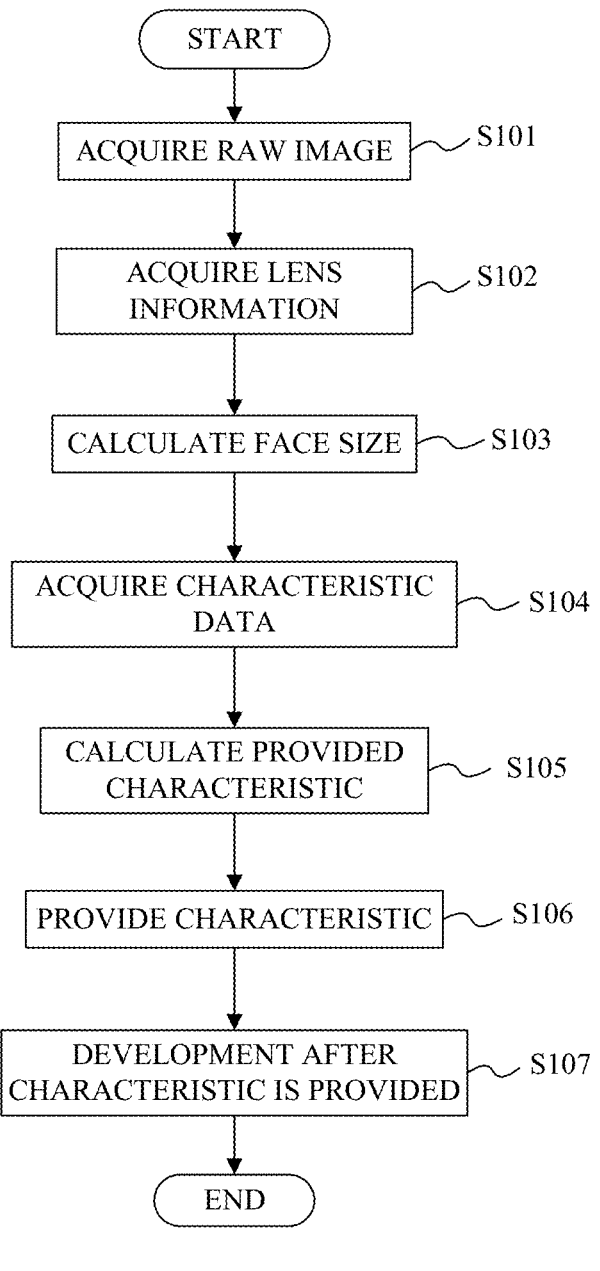
FIG. 2 is a flowchart illustrating the processing of the image pickup apparatus according to the first embodiment.

Referring now to FIG. 2, a description will be given of the processing (image processing method) of the image pickup apparatus 100. FIG. 2 is a flowchart illustrating the processing of the image pickup apparatus 100. Each step in FIG. 2 is mainly executed by the microcomputer 106 or by each component of the image pickup apparatus 100 based on an instruction from the microcomputer 106.

First, in step S101, the characteristic providing unit 103 acquires a raw image (raw image data, first image data) obtained by imaging from the sensor 102. Next, in step S102, the microcomputer 106 acquires lens information such as the focal length and focus position during imaging in step S101 from the lens information acquiring unit 105. Next, in step S103, the microcomputer 106 calculates the face size (size of the object area) using the lens information acquired in step S102. This embodiment describes a face (face area) as an object area, but is not limited to this example, and may use any other area treated as an object as an object area.

Next, in step S104, the microcomputer 106 acquires characteristic data corresponding to the face size calculated in step S103 from the memory 107. Next, in step S105, the microcomputer 106 calculates a characteristic (provided characteristic) to be provided to the raw image data based on the acquired characteristic data, and outputs the provided characteristic to the characteristic providing unit 103. At this time, the microcomputer 106 acquires the characteristic data stored in the memory 107. However, this embodiment is not limited to this example, and the microcomputer 106 may interpolate a plurality of characteristic parameters stored in the memory 107 according to the face size and acquire characteristic data. Alternatively, the microcomputer 106 may acquire characteristic data by enlarging or reducing the characteristic parameter stored in the memory 107 according to the face size.

Next, in step S106, the characteristic providing unit 103 provides a characteristic (characteristic data) to the raw image data (first image data) and thereby generates raw image data (second image data) to which the characteristic has been provided. Next, in step S107, the developer 104 develops the raw image data to which a characteristic (lens characteristic) has been provided, and generates a video signal (video signal data) that is used for recording or output.

Figure 3:
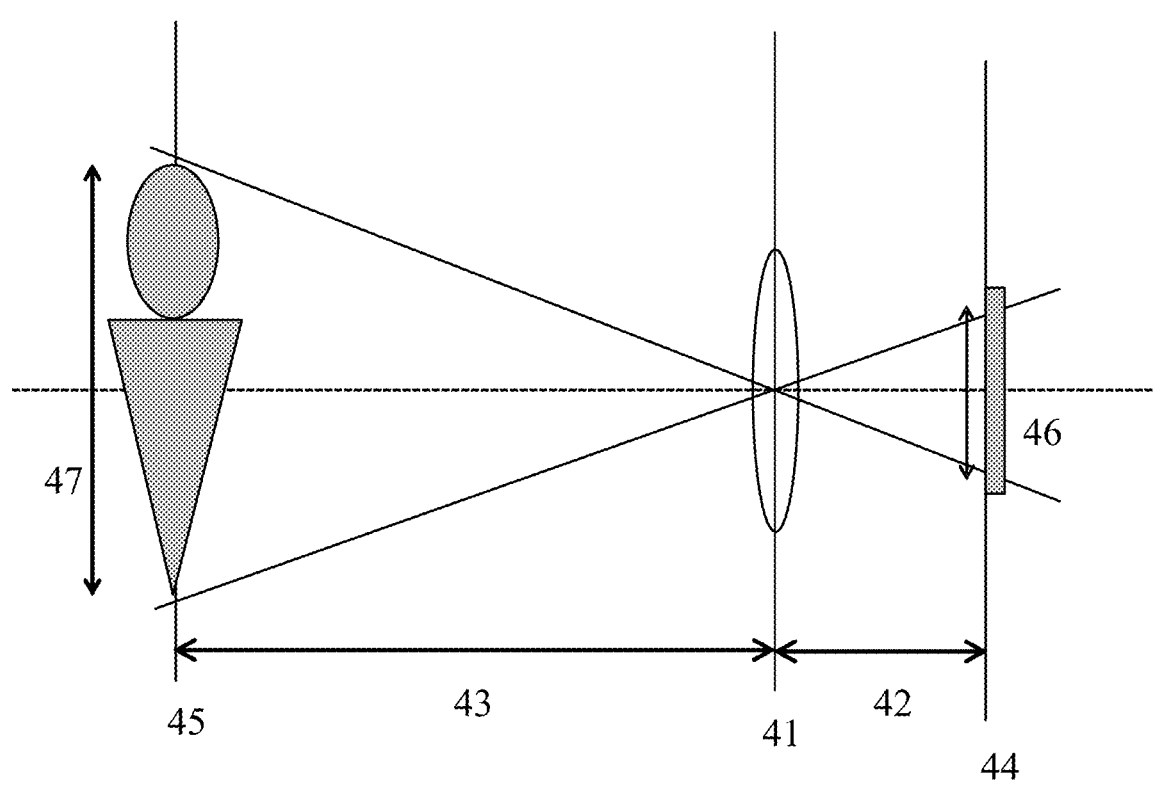
FIG. 3 explains a face size calculating method according to the first embodiment.

Referring now to FIG. 3, a description will be given of a calculating method (acquiring method) of the size of the face (object area) from the lens information acquired by the lens information acquiring unit 105. FIG. 3 explains a method for calculating the size of a face.

In FIG. 3, an image sensor 44 is placed on the right side of a lens 41. The distance between the lens 41 and the image sensor 44 will be referred to as an image sensor distance 42. On the other hand, an object 45 is placed on the left side of the lens 41. The distance between the lens 41 and the object 45 will be referred to as an object distance 43. The size of the object 45 will be referred to as an object size 47, and the size of the object size image reflected on the image sensor 44 will be referred to an object image size 46.

Where b is the image sensor distance 42, a is the object distance 43, c is the object size 47, and d is the object image size 46, the following equation (1) is established:

$$d/c = b/a \qquad (1)$$

Among these values, the image sensor distance 42 is a known distance from the image pickup apparatus 100, and the object distance 43 is a known distance from the focus position acquired by the lens information acquiring unit 105. In a case where the object 45 is a person's face, the object size 47 can be considered to be approximately 30 cm, which is a known size. Therefore, the object image size 46 is expressed by the following equation (2):

$$d = (c \times b)/a \qquad (2)$$

Now consider why the characteristic (such as the skin beautification effect) provided by the characteristic providing unit 103 is too strong or too weak depending on the object size. The function of the characteristic providing unit 103 is realized by a convolution calculation between an image and a point spread function (PSF) representing a lens characteristic to be provided. In other words, the influential pixel range is determined according to the PSF characteristic. Hence, even if the characteristic is proper for an object expressed in a large number of pixels, the influential area is too strong for an object expressed in a small number of pixels, and causes a blurred image.

Accordingly, this embodiment changes the PSF in consideration of the number of pixels representing the object. Thus, it is necessary to convert the object image size 46 acquired as described above into the number of pixels. In the image pickup apparatus 100, the pixel size on the sensor 102 is known. Then, the number n of object pixels can be expressed as in the following equation (3):

$$n = d/p \tag{3}$$

where p is the pixel size of the sensor 102.

Since the object image size 46 and the number of object pixels have been obtained, a description will now be given of the calculation of the provided characteristic (step S105 in FIG. 2). The memory 107 has stored a PSF characteristic representing a lens characteristic to be provided for each number of object pixels. The actual lens characteristic has a complicated shape and changes depending on the image position. Thus, this embodiment will discuss a case in which the PSF characteristic to be provided, which is a characteristic that can be relatively easily realized, is circular and has a uniform shape regardless of the position on the screen (the PSF characteristic has a characteristic value from the center in the image height direction).

The PSF characteristic is expressed as P(n, r) using the number of object pixels n and the image height r (distance from the center) of the characteristic. Assume that the number n of object pixels acquired as described above is between the number n1 of pixels whose PSF characteristic is stored in the memory 107 and the number n2 of pixels (n1<n<n2). Then, the PSF characteristic of the number of object pixels n is expressed as the following equation (4) by linear approximation:

$$P(n, r) = \frac{(n_2 - n) \times P(n_{1,r}) + (n - n_1) \times P(n_{2,r})}{(n_2 - n_1)} \tag{4}$$

Since the PSF characteristics P(n1, r) and P(n2, r) and the numbers n1 and n2 of pixels are known values stored in the memory 107, the PSF characteristic value of the number n of object pixels can be acquired. After the PSF characteristic to be provided is acquired, the characteristic providing unit 103 applies the PSF characteristic to the image data.

Figure 4:
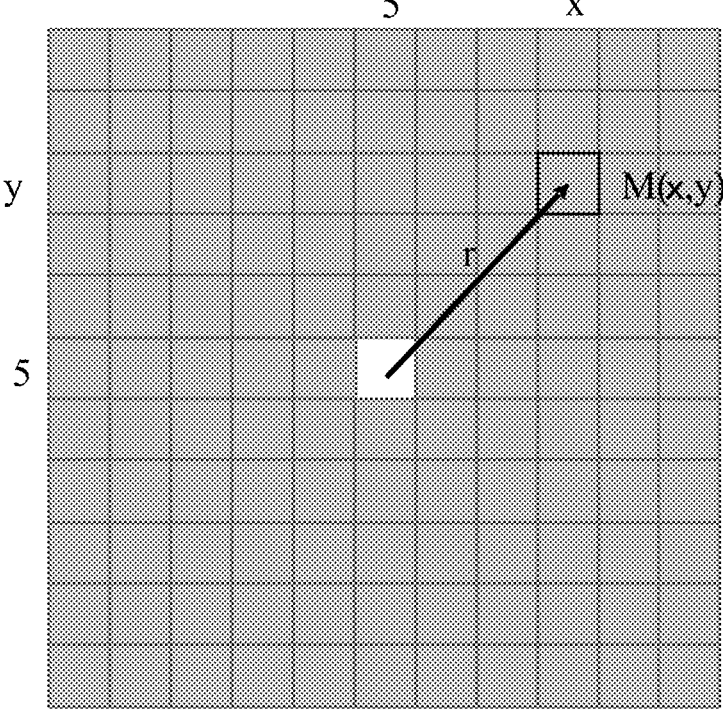
FIG. 4 explains a characteristic data calculating method according to in the first embodiment.

The characteristic providing unit 103 can provide a characteristic to image data, for example, by the convolution calculation. In this embodiment, the number of taps of the characteristic providing unit 103 that performs the convolution calculation is 11 taps as illustrated in FIG. 4. FIG. 4 explains a method of calculating characteristic data. In the convolution calculation in this case, an 11×11 matrix M(x, y) centered on the pixel of interest is given as a setting, and the convolution calculation is performed with the pixel data.

Where the image height r is a distance from the center pixel (x, y)=(5, 5), each coefficient of the matrix M(x, y) is expressed as in the following equation (5):

$$M(x, y) = P\left(n, \sqrt{(x - 5)^2 + (y - 5)^2}\right) \tag{5}$$

As described above, the matrix setting of the characteristic to be provided can be determined, and setting this setting in the characteristic providing unit 103 and calculating it can provide the desired characteristic to the image data.

This embodiment calculates the face size of the object in the raw image data (first image data) output from the sensor 102 based on the information acquired by the lens information acquiring unit 105, and provides a characteristic according to the face size using the characteristic providing unit 103. Therefore, this embodiment provides a characteristic according to the face size of the object, and thereby acquires a video to which a desired effect is applied, such as an effect that clearly expresses the skin while maintaining the definition sense.

In a case where the lens apparatus including the lens 101 is an interchangeable lens that can be attached to and detached from the camera body including the sensor 102 as in this embodiment, the characteristic provided to the image is affected by the attached interchangeable lens (attached lens) and the characteristic to be provided. In order to reduce the influence of the attached lens, the characteristic stored in the memory 107 may be a characteristic that corrects the characteristic of the attached lens and adds a characteristic to be provided.

In this embodiment, the raw image data is the first image data, but this embodiment is not limited to this example, and image data other than the raw image data (such as video signal data) may be used as the first image data.

Second Embodiment

Figure 5:
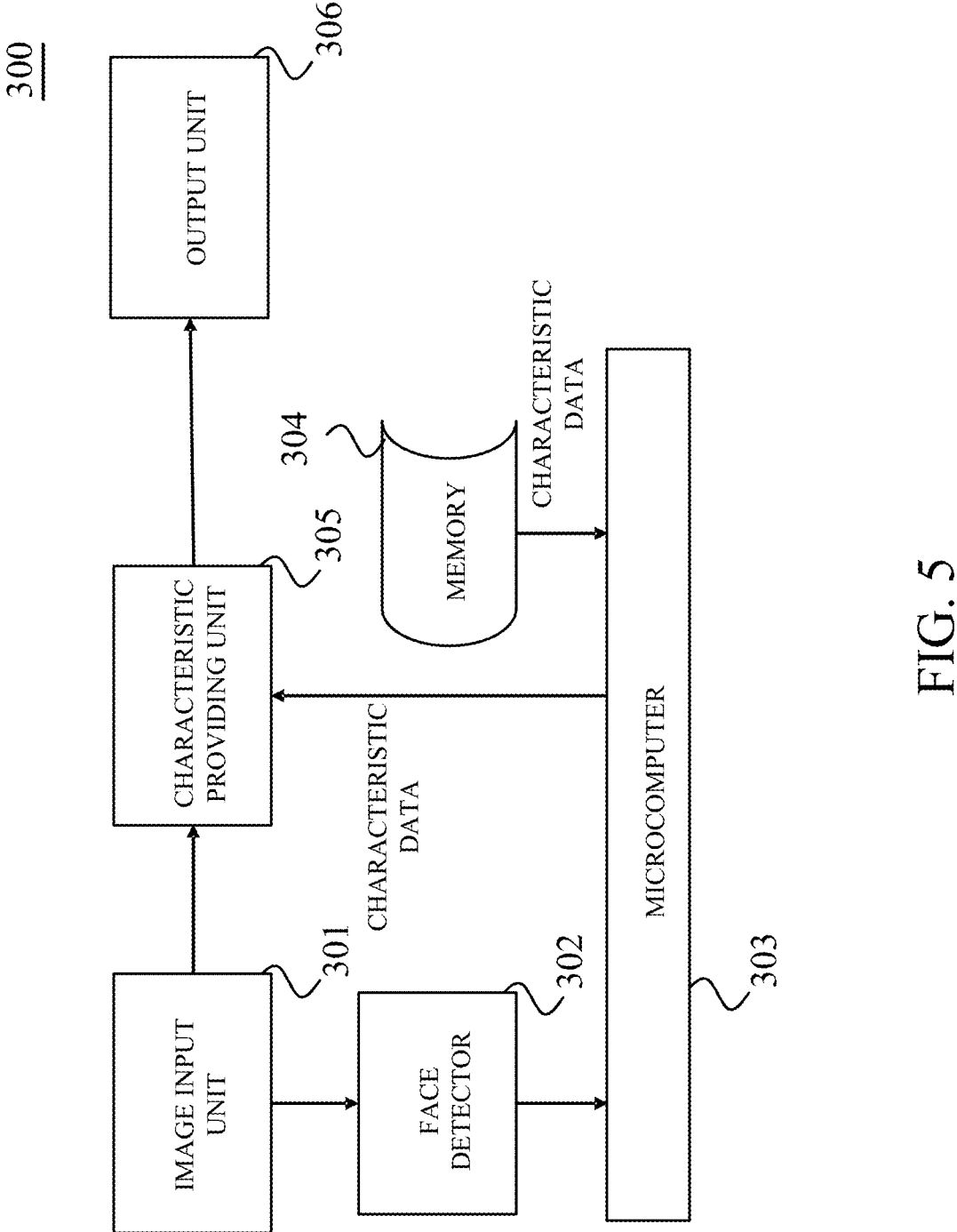
FIG. 5 is a block diagram of an image processing apparatus according to a second embodiment.

Referring now to FIG. 5, a description will be given of an image processing apparatus 300 according to a second embodiment. FIG. 5 is a block diagram of image processing apparatus 300. The image processing apparatus 300 can output a video in which a characteristic is provided to captured raw data.

The image input unit 301 inputs a captured image. A face detector (object acquiring unit) 302 searches the image input to the image input unit 301 for a face (object area), detects the face in the image, and outputs the size of the face (size of the object area). The size of the face output from the face detector 302 is notified to a microcomputer (characteristic data acquiring unit) 303. The microcomputer 303 reads characteristic data for image processing according to the size of the detected face, from the memory 304. The microcomputer 303 calculates characteristic data to be provided to the image using the characteristic data read from the memory 304 to, and sets the characteristic data to the characteristic providing unit (generator) 305. The characteristic providing unit 305 generates an image provided with a desired characteristic by convolving the image obtained from the image input unit 301 and the characteristic data set by the microcomputer 303. An output unit 306 outputs the image generated by the characteristic providing unit 305.

Figure 6:
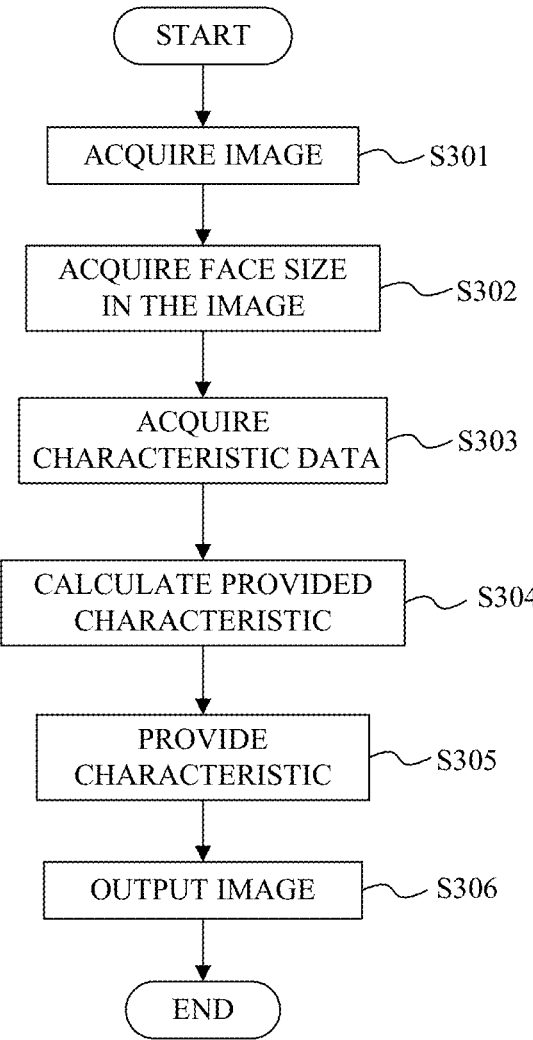
FIG. 6 is a flowchart illustrating the processing of the image processing apparatus according to the second embodiment.

Referring now to FIG. 6, a description will be given of the processing (image processing method) of the image processing apparatus 300. FIG. 6 is a flowchart illustrating the processing of the image processing apparatus 300. Each step in FIG. 6 is mainly executed by the microcomputer 303 or by each component in the image processing apparatus 300 based on an instruction from the microcomputer 303.

First, in step S301, the characteristic providing unit 305 obtains an image (image data) from the image input unit 301. The image acquiring method includes, but is not limited to, a method of reading and acquiring an image from a memory card, a method of reading and acquiring an image on a server, etc.

Next, in step S302, the face detector 302 detects a face (object area) in the image acquired in step S301 (image input to the image input unit 301). The microcomputer 303 then obtains the size of the face (the size of the object area). Various methods can be applied as a face detecting method, and for example, may use a method using pattern matching or a neural network. An arbitrary method can be used as long as it can detect a face and obtain the size of the face in the image. In this embodiment, the size of the image that is used for face detection and the size of the image to which a characteristic is provided are the same. However, in order to improve the processing speed of the face detection, this embodiment may use a reduced image, but in this case, it needs information about the size of the face in the image to which a characteristic is to be provided. Therefore, if necessary, this embodiment performs conversion from the face size obtained through detection.

Next, in step S303, the microcomputer 303 obtains characteristic data corresponding to the face size acquired in step S302 from the memory 304. At this time, the microcomputer 303 acquires, for example, characteristic data of a face size closest to the face size acquired in step S302 from among the characteristic data stored in the memory 304.

Next, in step S304, the microcomputer 303 calculates a characteristic (provided characteristic) to be provided to the image data based on the characteristic data acquired in step S303, and outputs the provided characteristic to the characteristic providing unit 305. In a case where the memory 304 stores the characteristic data at high resolution for each face size, the stored characteristic data can be used as is. In a case where the characteristic data stored in the memory 304 has a coarse resolution, the characteristic data may be obtained by interpolating from two characteristic data having the closest face sizes.

In a case where the characteristic data is not a parameter settable to the characteristic providing unit 305, it is necessary to convert it into a settable parameter. For example, as described in the first embodiment, this is a case where the PSF characteristic is stored as a parameter in the image height direction, or where it is stored approximately as a polynomial. Generally, the characteristic providing unit 305 is realized by a convolution calculation between an image and data representing a PSF characteristic, so in the case of characteristic data described above, conversion to data representing a PSF characteristic is required. Since the conversion to data representing PSF characteristics was explained in the first embodiment, a description thereof will be omitted.

Next, in step S305, the characteristic providing unit 305 provides a characteristic (characteristic data) to the image data (first image data). That is, the characteristic providing unit 305 performs a convolution calculation for the image data acquired in step S301 and the characteristic data calculated in step S304, thereby providing a desired characteristic to the image data. Next, in step S306, the output unit 306 outputs image data (second image data) to which a characteristic (lens characteristic) has been provided. The image data may be output by any method such as outputting a video signal (video signal data) or recording it as an image file on a memory card or server.

The above two embodiments describe an example of calculating a provided characteristic according to the face size, and the calculation equation for calculating the provided characteristic is not limited to that described in the above two embodiments. In a case where the size of the object area is the first size, the provided characteristic may be calculated so that bokeh becomes smaller than that in a case where the size of the object area is the second size larger than the first size. In a case where a difference between the first size and the second size is smaller than a predetermined threshold, the provided characteristic for the first size and the provided characteristic for the second size may be made equal to each other. That is, the size of the object area may be divided into a plurality of stages, and the provided characteristic may be calculated for each stage. For example, in a case where the size of the object area is a size included in the first range, the provided characteristic may be provided so that bokeh is smaller than that in a case where the size of the object area is larger than the size included in the first range. Alternatively, in a case where the size of the object area is the included in the first range, the provided characteristic may be provided so that the bokeh is larger than that in a case where the size of the object area is smaller than the size included in the first range.

OTHER EMBODIMENTS

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

Each example provides an image processing apparatus that can easily acquire an image to which a desired effect is provided regardless of the size of an object area in the image.

This application claims the benefit of Japanese Patent Application No. 2023-003863, filed on Jan. 13, 2023, which is hereby incorporated by reference herein in its entirety.

What is claimed is:

1. An image processing apparatus comprising:
an image sensor that converts an optical image captured by an optical system to a first image data;
a memory storing instructions; and
a processor configured to execute the instructions to:
    acquire and calculate a size of an object area of an object in the first image data,
    acquire and process characteristic data on a characteristic of an optical system used to capture the first image data, and
    generate a second image data for display by applying the acquired characteristic data to the first image data,
    wherein the acquired characteristic data on the characteristic of the optical system is selected and processed based on the size of the object area.

2. The image processing apparatus according to claim 1, wherein the processor is configured to generate the second image data by performing image processing for the first image data using the characteristic data corresponding to the characteristic of the optical system.

3. The image processing apparatus according to claim 1, wherein the first image data is raw image data.

4. The image processing apparatus according to claim 1, wherein the first image data is video signal data.

5. The image processing apparatus according to claim 1, wherein the object area is a face area.

6. The image processing apparatus according to claim 5, wherein the processor is configured to detect the face area from the first image data.

7. The image processing apparatus according to claim 1, wherein the processor is configured to acquire the object area from at least one of a focus position, zoom magnification, a focal length of the optical system, a pixel pitch of an image sensor, or the effective number of pixels of the image sensor.

8. The image processing apparatus according to claim 1, wherein the processor is configured to calculate the size of the object area based on at least one of the number of output pixels of an image sensor, an enlargement rate and reduction rate of the first image data.

9. The image processing apparatus according to claim 1, wherein the size of the object area is a size of a processing area of the processor.

10. The image processing apparatus according to claim 1, wherein the size of the object area is a ratio of an entire size of the first image data.

11. The image processing apparatus according to claim 1, wherein the processor is configured to acquire the characteristic data by interpolating a plurality of characteristic parameters stored in the memory according to the size of the object area.

12. The image processing apparatus according to claim 1, wherein the processor is configured to acquire the characteristic data by enlarging or reducing a characteristic parameter stored in the memory according to the size of the object area.

13. The image processing apparatus according to claim 1, wherein the characteristic of the optical system is an aberration characteristic.

14. The image processing apparatus according to claim 13, wherein in a case where the size of the object area is a first size, the processor is configured to acquire the characteristic data in which bokeh is smaller than in a case where the size of the object area is a second size that is larger than the first size.

15. An image pickup apparatus comprising:
the image processing apparatus according to claim 1; and
an image sensor configured to output first image data.

16. An image processing method comprising the steps of:
converting an optical image captured by an optical system to a first image data;
acquiring and calculating a size of an object area of an object in the first image data;
acquiring and processing characteristic data on a characteristic of an optical system used to capture the first image data; and
generating a second image data for display by applying the acquired characteristic data to the first image data,
wherein the acquired characteristic data on the characteristic of the optical system is selected and processed based on the size of the object area.

17. A non-transitory computer-readable storage medium storing a program that causes a computer to execute the image processing method according to claim 16.

* * * * *